United States Patent [19]
Umeda et al.

[11] 3,955,851
[45] May 11, 1976

[54] STOPPER DEVICE FOR USE IN DUMP TRUCK'S VESSEL

[75] Inventors: Haruhiko Umeda, Yokohama; Katsuyoshi Mori, Tokyo; Kyozo Sendai, Kawasaki; Isao Ikeda, Yokohama, all of Japan

[73] Assignee: Kabushiki Kaisha Komatsu Seisakusho, Tokyo, Japan

[22] Filed: July 8, 1974

[21] Appl. No.: 486,470

[30] Foreign Application Priority Data
Sept. 28, 1973 Japan .................... 48-112406[U]

[52] U.S. Cl. .................... 214/17 R; 105/278; 298/17 B
[51] Int. Cl.² .................... B60P 1/04
[58] Field of Search .......... 298/1 R, 38, 17 B, 17 R; 214/1 A, 314, 1 Q, 502; 105/278; 248/140, 142, 358 A

[56] References Cited
UNITED STATES PATENTS

| | | |
|---|---|---|
| 1,794,297 | 2/1931 | Johnson .............................. 248/140 |
| 2,767,997 | 10/1956 | Summers ............................ 214/501 |
| 2,997,342 | 8/1961 | Talbert............................ 298/1 R X |
| 3,272,558 | 9/1966 | Rathman et al.............. 298/17 B X |

*Primary Examiner*—Frank E. Werner
*Attorney, Agent, or Firm*—Armstrong, Nikaido & Wegner

[57] ABSTRACT

A stopper device for a vessel of a dump truck comprises a wire rope connected to the rear end portion of the vessel and having a ring formed at the free end thereof. A retaining member projects from a rear axle tube and is adapted to be engageable with and disengageable from the ring, whereby the weight of the stopper is significantly reduced and the vessel can be easily held at a rearwardly tilted position when required.

3 Claims, 3 Drawing Figures

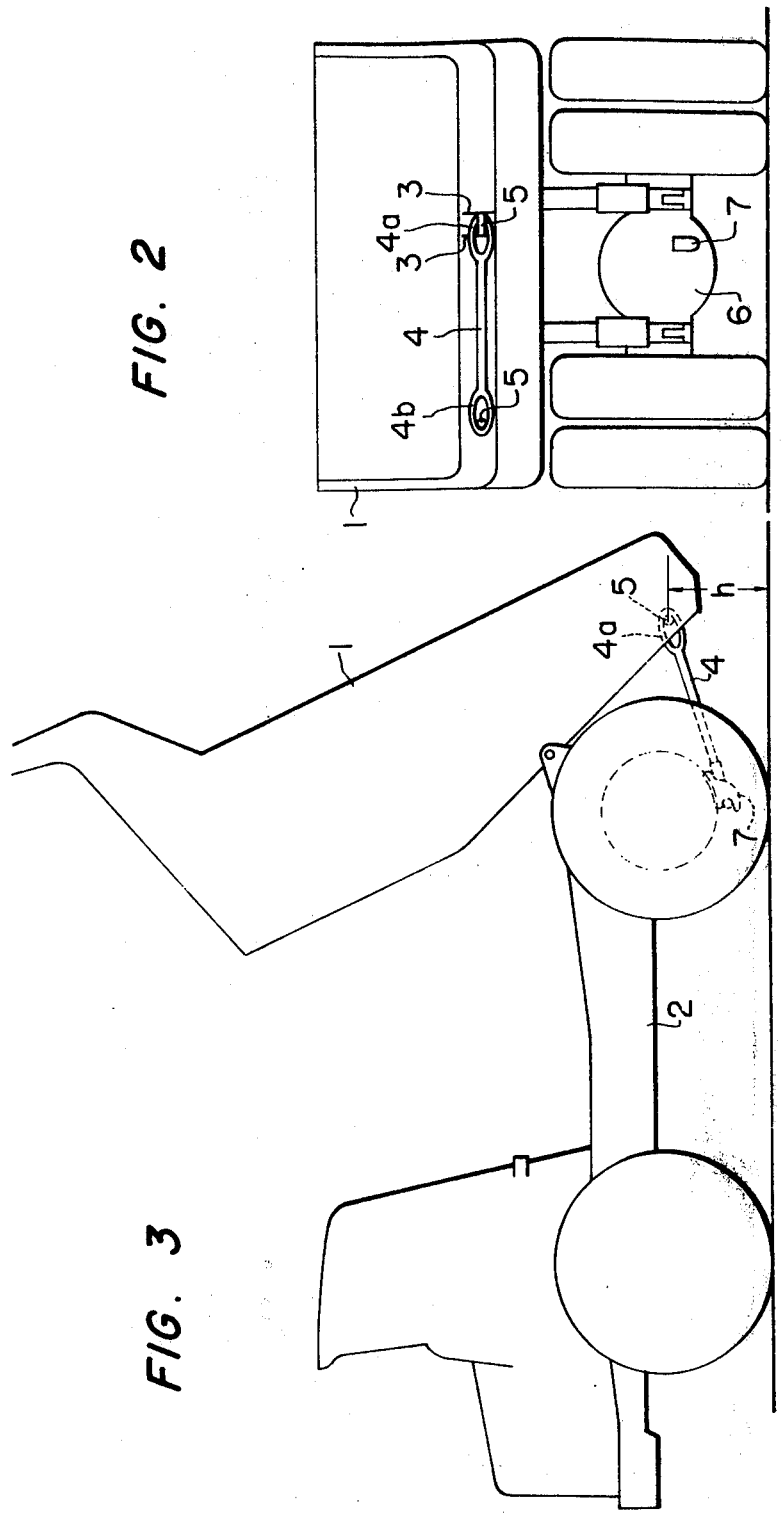

STOPPER DEVICE FOR USE IN DUMP TRUCK'S VESSEL

BACKGROUND OF THE INVENTION

1. Field of the Invention

This invention relates to a stopper device for a dump truck's vessel.

2. Description of the Prior Art

The stopper device which has heretofore been employed for a dump truck's vessel comprises a stopper rod "b" pivotally connected to a frame "a" of the vehicle body as shown in FIG. 1. According to this device, the stopper rod b is rotated upwards to a predetermined position as shown in solid line only when it is required to hold a vessel "c" at a raised position, for example, when maintenance work is carried out on the vehicle. The stopper rod, however, consists of a round bar or pipe, which tends to be buckled by the compressive force exerted thereon. Further, the stopper rod is disadvantageous in that since it is manually operated it is necessary to increase the size and weight of the rod with the increase in the size of vehicles thereby rendering the vessel raising operation dangerous.

SUMMARY OF THE INVENTION

The present invention is contemplated in the light of the above-mentioned situation, and has for its object to provide a lightweight stopper made of a wire rope for holding a vessel at a rearwardly tilted position thereby reducing the weight of the stopper and achieving easy and safe operation of the stopper.

BRIEF DESCRIPTION OF THE DRAWINGS

The above and other objects, features and advantages of the present invention will now become apparent from the following description taken in conjunction with the accompanying drawings in which:

FIG. 2 is a diagrammatic representation of the construction of one embodiment of the stopper device according to the present invention, and FIG. 3 is a diagrammatic view of the operation of the device.

DETAILED DESCRIPTION OF THE PREFERRED EMBODIMENTS

Figure 1:
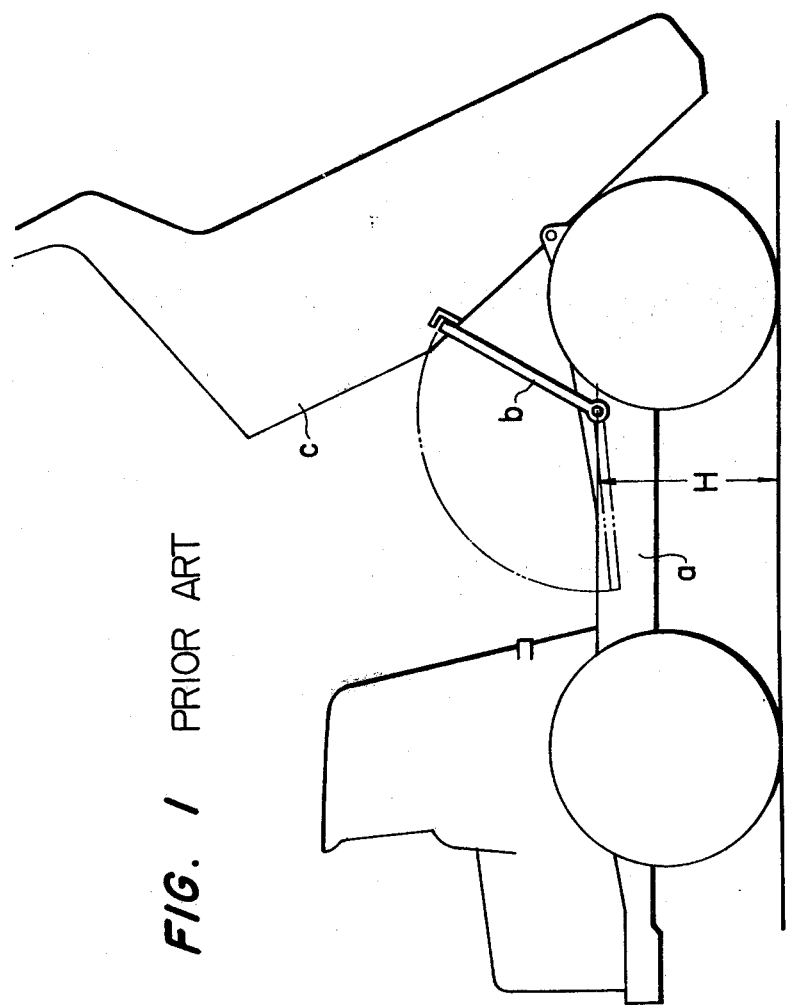
FIG. 1 is a side elevational view of a dump truck provided with a conventional stopper device for the vessel.

In FIGS. 2 and 3, reference numeral 1 represents a vessel which is pivotally mounted on a frame 2 forming part of the vehicle body and can be tilted a dumping operation by the action of a dump cylinder (not shown). The vessel 1 has in the lower portion on the rear side thereof brakets 3 and 3 which project rearwardly. Engaged with the brakets 3 an 3 through a pin 5 is a ring 4a which is formed at one end of a wire rope 4. A similar ring 4b is formed at the other end of the wire rope 4 and is engageable with and disengageable from a retaining member 5 which projects on the rear side of the vessel 1. Further, a hook shaped retaining member 7 is provided to project in the lower portion of a rear axle tube 6.

When the vessel 1 is held in a rearwardly tilted position for the purpose of maintenance and repair works on the vehicle, the ring 4b at the other end of the wire rope 4 is disengaged from the retaining member 5 and is engaged with a retaining member 7 provided on the rear axle tube 6. Since only a tensile load is exerted on the wire rope 4, it is unnecessary to greatly increase the diameter of the wire rope.

As mentioned in detail hereinbefore, the present invention comprises a wire rope 4 connected to the rear end portion of a vessel 1 and having a ring 4b formed at the free end thereof, and a retaining member 7 projecting from a rear axle tube 6, and adapted to be engaged by said ring. Therefore, when it is desired to hold the vessel 1 at a rearwardly inclined position, it is only necessary to engage the ring 4b of the wire rope 4 with the retaining member 7. Further, since only a tensile force is exerted on the wire rope, it is unnecessary to significantly increase the diameter of the wire rope so that the weight of the stopper can be considerably reduced as compared with that of the conventional stopper. Moreover, the height "h" of the retaining member 7 of the present invention above the ground level is much lower than the height H of the conventional stopper above the ground level so that the wire rope can be engaged with the retaining member on the ground whereby rendering the operation of securing the vessel at a rearwardly tilted position very easy.

What is claimed is:

1. In combination, a vessel tiltably mounted on a dump truck and a stopper device comprising a wire rope coupled to the rear end portion of the vessel, said rope having a ring formed at the free end thereof, and a retaining means projecting from a rear axle housing on said truck, said retaining means engaging said ring to tension said rope and thereby hold said vessel in a fully tilted position, said rope preventing said vessel from moving from said fully tilted position.

2. The stopper device of claim 1, wherein said retaining means is a hook.

3. The stopper device of claim 1, wherein said rope has a ring formed at the end coupled to said vessel, said ring engaging a retaining member on said vessel.

\* \* \* \* \*